United States Patent Office 2,941,506
Patented June 21, 1960

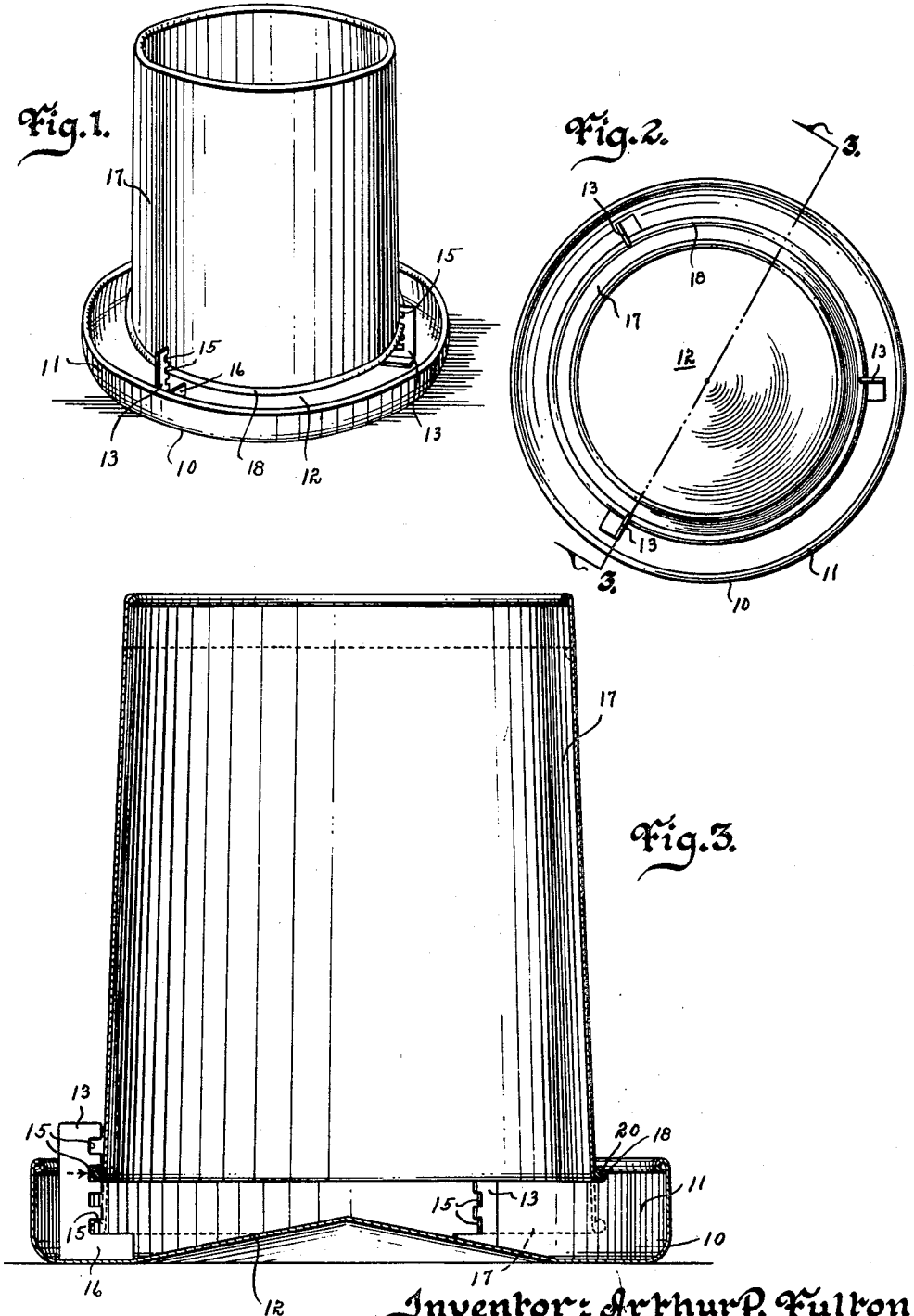

2,941,506
ADJUSTABLE FEEDER
Arthur P. Fulton, Shreveport, La., assignor to Fulton Company, Shreveport, La., a corporation
Filed July 7, 1958, Ser. No. 747,043
7 Claims. (Cl. 119—53)

This invention relates to a device for dispensing feed and more particularly to an adjustable feeder for fowls and like.

Devices for supplying feed are old. Usually such devices have an auxiliary feed supply compartment that has an open end terminating in a trough member. As the feed is devoured from the trough member, additional feed will automatically flow from the supply compartment into the trough member. The difficulty is, however, that various types or textures of feed flow downwardly differently from the supply compartment into the trough portion. Obviously with some feeds, if the bottom outlet end of the supply compartment is too far above the bottom of the trough member, the feed might well flow over the top horizontal rim of the trough portion. Conversely, if the lower end of the supply compartment is too close to the inside bottom of the trough member, some feeds will not successfully automatically flow into the trough member. Some attempt has been made to vertically adjust the height of the supply compartment relative to the trough member, but such efforts are complicated, require the use of tools, and are time-consuming.

Therefore, one of the principal objects of my invention is to provide a feeder that has a supply container that may be easily and quickly adjusted vertically relative to its associated trough member.

A further object of this invention is to provide an adjustable feeder that requires no tools to effect such adjustment.

Still further objects of my invention are to provide a feeder that is economical in manufacture, durable in use, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a perspective view of my feeder ready for use,

Fig. 2 is an enlarged top plan view of my device and more fully illustrates its construction, and Fig. 3 is an enlarged vertical sectional view of my feeder taken on line 2—2 of Fig. 2.

Although I describe my feeder for use in the feeding of fowl, obviously it may be used in the feeding of various types of animals.

I have used the numeral 10 to designate the trough portion. This trough portion may be of any suitable form but in the drawings I show it as a tray having a continuous vertical circular rear wall 11. The inside bottom 12 of this tray extends downwardly and outwardly from its center as shown in Fig. 3. Rigidly secured in spaced relationship on the inside bottom of the tray 10 and near the tray wall 11 are three vertical brackets 13. In the inner side edge portion of each bracket is a plurality of spaced apart horizontal notches 15, as shown in Fig. 3. The base 16 of each bracket is of a width greater than that of its upper vertical portion.

The numeral 17 designates the auxiliary feed supply container in the form of a vertical cylinder having its top and bottom open. The lower end of this cylinder 17 is larger than that of its upper end so that feed therein will automatically move downwardly without clogging. The numeral 18 designates a continuous tube on the lower outer end of the cylinder 17 having a diameter slightly greater than that of the continuous arc of the inner upper edges of the brackets 13. The cylinder 17 and tube 18 are formed of metal, plastic, or like, having flexible resilient character. If further flexible resilient force is needed, a spring or like ring 20 may be placed in the tube 18. Either the tube or tube and ring will yieldingly hold in a perfect circle.

To install the auxiliary container 17 onto the tray trough portion, the tube portion is manually compressed or distorted as to pass to the inside of the inner sides of the brackets. Upon release of such manual pressure, the tube ring will return to that of a perfect circle and will thereby expand and enter into a notch 15 of each of the brackets. This will detachably rigidly secure the supply container to the trough portion. Feed placed in the supply container will pass into the tray as the feed is used from the tray and due to the domed bottom 12 will pass horizontally outwardly to the wall 11 of the tray trough. By selecting the appropriate notches 15 in the brackets, the lower end of the feed supply container may be vertically adjusted relative to the bottom of the tray and relative to the horizontal plane of the top of the rim wall 11.

To remove the supply container or to adjust it to another position, it is merely necessary to compress or distort the rim tube to clear the notches 15 of the three brackets. A lid (not shown) may be used to enclose the open top of the supply container 17.

Some changes may be made in the construction and arrangement of my adjustable feeder without departing from the real spirit and purpose of my invention, and it is my intention to cover by my claims, any modified forms of structure or use of mechanical equivalents which may be reasonably included within their scope.

I claim:

1. In a feeder, a trough portion, a plurality of members spaced in said trough, each having at least one notch in its inner edge, and a supply container having an open rim bottom yieldingly extending into a notch of each of said plurality of spaced members in said trough.

2. In a feeder, a trough, a plurality of spaced vertical members in said trough each having a plurality of spaced vertically arranged horizontal notches facing inwardly toward the center area of said trough portion, an auxiliary container having an open bottom emptying into said trough, a means on said container having resilient characteristics selectively engaging the notches of each of said spaced vertical members.

3. In a feeder, a trough, a plurality of spaced vertical members in said trough each having a plurality of spaced vertically arranged horizontal notches facing inwardly toward the center area of said trough portion, an auxiliary container having an open bottom emptying into said trough, a spring ring rim portion on the bottom of said container having resilient characteristics selectively engaging the notches of each of said spaced vertical members.

4. In a feeder, a trough, a plurality of spaced vertical members in said trough each having a plurality of spaced vertically arranged horizontal notches facing inwardly toward the center area of said trough portion, an auxiliary container having an open bottom emptying into said trough, a rim portion on said container having resilient characteristics selectively engaging the notches of each of said spaced vertical members.

5. In a feeder, a trough, a plurality of spaced vertical members in said trough each having a plurality of spaced vertically arranged horizontal notches facing inwardly toward the center area of said trough portion, an auxiliary container having an open bottom emptying into said trough, a rim portion on the bottom of said container having resilient characteristics selectively engaging the notches of each of said spaced vertical members; said rim portion being in the form of a circular tube.

6. In a feeder, a trough, a plurality of spaced vertical members in said trough each having a plurality of spaced vertically arranged horizontal notches facing inwardly toward the center area of said trough portion, an auxiliary container having an open bottom emptying into said trough, a rim portion on the bottom of said container having resilient characteristics selectively engaging the notches of each of said spaced vertical members; said rim portion being in the form of a circular tube, and a spring ring inside said tube.

7. In a feeder, a trough, a plurality of spaced vertical members in said trough each having a plurality of spaced vertically arranged horizontal notches facing inwardly toward the center area of said trough portion, an auxiliary container having an open bottom emptying into said trough, a rim portion on the bottom of said container having resilient characteristics selectively engaging the notches of each of said spaced vertical members; said trough having an outer wall and a bottom sloping outwardly and downwardly toward said outer wall.

References Cited in the file of this patent
UNITED STATES PATENTS

| | | |
|---|---|---|
| 1,138,291 | Hilliard | May 4, 1915 |
| 2,789,534 | Landgraf | Apr. 23, 1957 |